US009826082B2

United States Patent
Alameh et al.

(10) Patent No.: US 9,826,082 B2
(45) Date of Patent: Nov. 21, 2017

(54) ADAPTIVE FILTERING FOR PRESENCE DETECTION

(71) Applicant: Motorola Mobility LLC, Chicago, IL (US)

(72) Inventors: Rachid M Alameh, Crystal Lake, IL (US); Adam J Bousley, Chicago, IL (US); Thomas Y Merrell, Beach Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 186 days.

(21) Appl. No.: 14/620,257

(22) Filed: Feb. 12, 2015

(65) Prior Publication Data

US 2016/0241704 A1    Aug. 18, 2016

(51) Int. Cl.
  *H04M 1/725*  (2006.01)
  *H04M 1/67*   (2006.01)
  *H04W 52/02*  (2009.01)

(52) U.S. Cl.
  CPC ... *H04M 1/72569* (2013.01); *H04W 52/0251* (2013.01); *H04M 1/67* (2013.01); *Y02B 60/50* (2013.01)

(58) Field of Classification Search
  CPC .............. G06F 17/30867; H04N 7/185; H04N 19/533; H04N 19/557; H04N 19/57; H04W 4/02; H04W 4/025; H04W 52/00; G01C 21/3407; H04M 1/67; H04M 1/72569
  See application file for complete search history.

(56) References Cited

U.S. PATENT DOCUMENTS

| 5,197,489 A | * | 3/1993 | Conlan | A61B 5/11 600/484 |
| 8,369,888 B1 | * | 2/2013 | Miller | H04M 1/72569 455/550.1 |
| 2007/0182554 A1 | * | 8/2007 | Elwell | G08B 13/1627 340/567 |
| 2013/0035790 A1 | * | 2/2013 | Olivier, III | G05D 1/0246 700/246 |

(Continued)

FOREIGN PATENT DOCUMENTS

| WO | 2014172076 A1 | 10/2014 |
| WO | 2015038404 A1 | 3/2015 |

OTHER PUBLICATIONS

Rachid M. Alameh, et al., "Portable Electronic Device with Proximity Sensors for Gesture Control and Contact Detection"; U.S. Appl. No. 14/619,263, filed Feb. 11, 2015, 44 pages.

(Continued)

*Primary Examiner* — Olumide T Ajibade Akonai
(74) *Attorney, Agent, or Firm* — Miller, Matthias & Hull LLP

(57) ABSTRACT

A system and method for sensing a user presence via thermal signature sensing employs adaptive filtering of a motion spectrum to discern a user presence signature over background thermal noise. In an embodiment, adaptive sub-band filters are applied within the motion spectrum, and a user presence is indicated by the presence of a thermal signature having at least a predetermined magnitude or profile within any searched sub-band. In an embodiment, a low pass filter is applied to search for a stationary presence if the sub-band search procedure does not yield a user thermal signature.

15 Claims, 9 Drawing Sheets

(56) References Cited

U.S. PATENT DOCUMENTS

2014/0086279 A1* 3/2014 Cao .................. G01K 1/026
374/183
2014/0197317 A1 7/2014 Yang et al.

OTHER PUBLICATIONS

Rachid M. Alameh, et al., "Portable Electronic Device with Dual Diagonal Proximity Sensors and Mode Switching Functionality"; U.S. Appl. No. 14/595,257, filed Feb. 13, 2015, 40 pages.
Rachid M. Alameh, et al., "Portable Electronic Device with Dual Diagonal Proximity Sensors and Mode Switching Functionality"; U.S. Appl. No. 14/595,258, filed Jan. 13, 2015, 38 pages.
Rachid M. Alameh, et al., "Portable Electronic Device with Dual, Diagonal Proximity Sensors and Mode Switching Functionality"; U.S. Appl. No. 14/595,261, filed Jan. 13, 2015, 35 pages.
Great Britain Search Report Application No. GB1601758.4 dated Apr. 29, 2016.

* cited by examiner

ADAPTIVE FILTERING FOR PRESENCE DETECTION

TECHNICAL FIELD

The present disclosure is related generally to mobile device access, and, more particularly, to a system and method for detecting and characterizing a user presence based on filtered thermal signal searching.

BACKGROUND

According to recent studies, owners of portable electronic devices now spend on average more than three hours each day using their device. Moreover, these interactions are no longer simply voice calls; users now plan, purchase, play, and schedule on their devices as well. Rather than slowly multitasking via several devices, or being forced to use a traditional PC platform for long periods of time, users can now quickly handle many smaller tasks on a single device during lulls in other activities.

However, portable electronic devices generally require battery power, and most portable electronic devices are therefore configured to automatically lock or go idle after a certain period of disuse in order to save battery power. As such, the user must generally unlock the device each time they wish to begin a new task or to finish a task that was partially executed previously, and each unlocking interaction costs time. The sheer number and frequency of discrete user interactions each day mean that any access delays can accumulate to a significant loss of productivity over the course of the day.

While the present disclosure is directed to a system that can eliminate some of the shortcomings noted in this Background section, it should be appreciated that any such benefit is not a limitation on the scope of the disclosed principles, nor of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
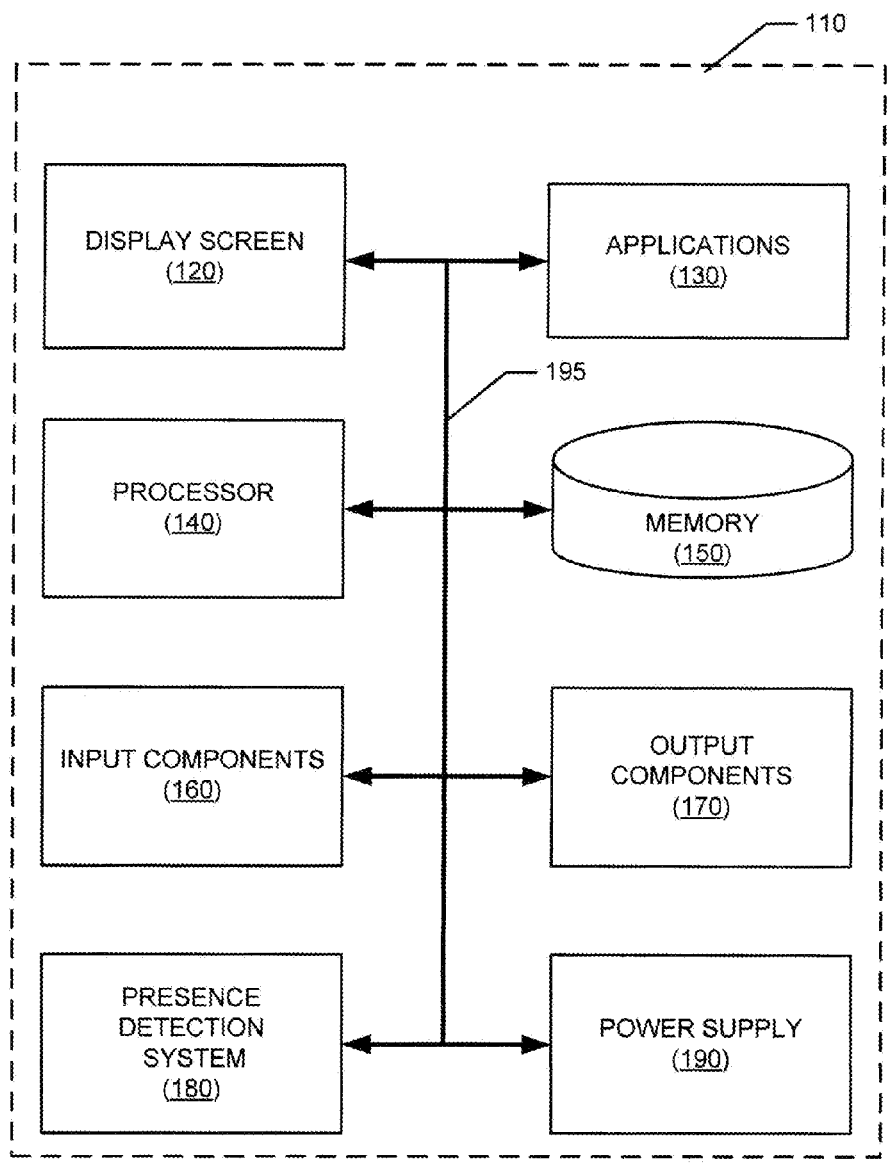
FIG. 1 is a simplified schematic of an example device with respect to which embodiments of the presently disclosed principles may be implemented.

Before presenting a detailed discussion of embodiments of the disclosed principles, an overview of certain embodiments is given to aid the reader in understanding the later discussion. As noted above, users of portable electronic devices may incur a significant cumulative time cost due to delays in accessing their device during each of many accesses per day.

To ameliorate this problem and reduce the time cost to the user, a device is constructed and configured in an embodiment to detect a user presence, as well as characteristics of that presence such as speed of movement, proximity and so on. In response to the detection of the user presence, the device, as configured, then proactively executes one or more tasks to ease the ability of the user to access the device. This occurs without compromising device security or integrity.

In an embodiment, the device includes at least one thermal sensor such as a thermal pile, with sufficient sensitivity to detect a user heat signature from the point of touch up to about 10 feet away from device. The device is configured to utilize data from the thermal sensor to distinguish between different user presence states and parameters, such as stationary presence, user in motion, user speed, user range, user grip, and touchless gesturing control at low power. To enable the device to distinguish various states and parameters, an adaptive filter is provided that can discern weak user signatures despite background thermal noise.

In various environments, the background thermal noise can result from passive/momentary heat signatures, car environment heat sources, hot-to-cold and cold-to-hot transitions of the user and device, thermal sensor resolution, thermal sensor response and recovery time, and internal device heat. Even against these possibly changing sources of error, the device is able to detect user stationary presence, user motion, user approach speed, user grip, user proximity, and user gestures.

To allow detection across the effective distance range when encountering different thermal backgrounds, the device is configured to apply an adaptive search filter having adaptive thresholds for thermal detection. In this way, the device can detect weak user heat signatures from distant users while also maintaining rapid operation when a clear user heat signature from a nearby user is present. In an embodiment, the applied procedure employs adaptive detection windows for each of one or more sensors.

User motions usually have a predominant frequency in the range of from about 0.1 Hz up to about 6 Hz. However, a stationary user presents a heat signature changing at essentially zero Hz. In one embodiment, the portable electronic device is configured to sweep a narrow sub-band frequency filter across the thermal sensor output until a user presence signature is detected or until all sub-bands have been searched with no signature detected.

Alternatively, instead of sweeping a sub-band filter, the device may switch between multiple discrete sub-band filters which together cover the intended search spectrum, e.g., 0.1 Hz to 6 Hz. In either case, the width of the sub-band filter(s) may be adaptive, and a narrow filter allows the detection of a specific motion while keeping the noise bandlimited. This results in a high signal-to-noise ratio (SNR).

In an embodiment, the sub-band search is commenced at the high frequency end (top) of the spectrum (corresponding to faster movements, which may indicate closer user proximity as well) and proceeds downward through lower frequencies to the low frequency end (bottom) of the searched spectrum. If motion is detected, then the device halts the search. As noted below, a search at zero Hz may also be executed if no motion presence is found during the spectrum search.

A moving thermal signature is easier to correctly identify than a stationary or non-moving user presence, since the non-moving user presence signature can more easily be confused with thermal noise and artificial sources. However, if fast motion is not detected, then the device sweeps the filter (or switches through discrete filters) downward toward the slower motions/lower frequencies to the lower end of the range, e.g., 0.1 Hz. If no motion is detected while searching the whole motion detection range, the device is configured in an embodiment to then switch to detecting motionless/stationary presence. In particular, to assess stationary presence while minimizing the effect of background thermal noise, the device switches filter types in an embodiment from narrow band pass to narrow low pass.

As noted above, the device may be configured to adapt the applied sweep filter (or discrete filters) to balance speed of detection with signal strength. For example, in an embodiment, when the user signal signature is strong or likely to be strong, such as when the user is near device (e.g., within 5 feet), the device may employ a single broad band pass filter covering the entire motion spectrum (e.g., 0.1-6 Hz).

However, as the user signature gets smaller (such as when the user is further away from the device, e.g., 5 to 8 feet away), the device reverts, in an embodiment, to applying a number of medium bandwidth sub-band filters (e.g., high, mid, and low) instead of a single band pass filter. In this example, each of the sub-band filters covers about 2 Hz. As the signal gets even smaller, the device reverts, in an embodiment, to yet more and yet narrower sub-band filters, or a yet narrower swept sub-band filter, having, for example, a sub-band filter width of 0.5 band pass bandwidth. In this way, again, the device is able to adaptively balance speed of detection with ease of detection.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, personal computers, embedded automobile computing systems and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point, and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

Although not shown, the device 110 may include software and hardware networking components to allow communications to and from the device. Such networking components will typically provide wireless networking functionality, although wired networking may additionally or alternatively be supported.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various display icons that are linked to executable applications).

In an embodiment of the disclosed principles, the illustrated device 110 also includes a presence detection system 180 equipped and configured to adaptively detect a thermal signature of a user as well as potentially detecting various parameters related to the user presence, despite background thermal noise. To accomplish such tasks, the presence detection system 180 includes certain subsystems and components, as will be described in greater detail below during the discussion of FIG. 2.

Figure 2:
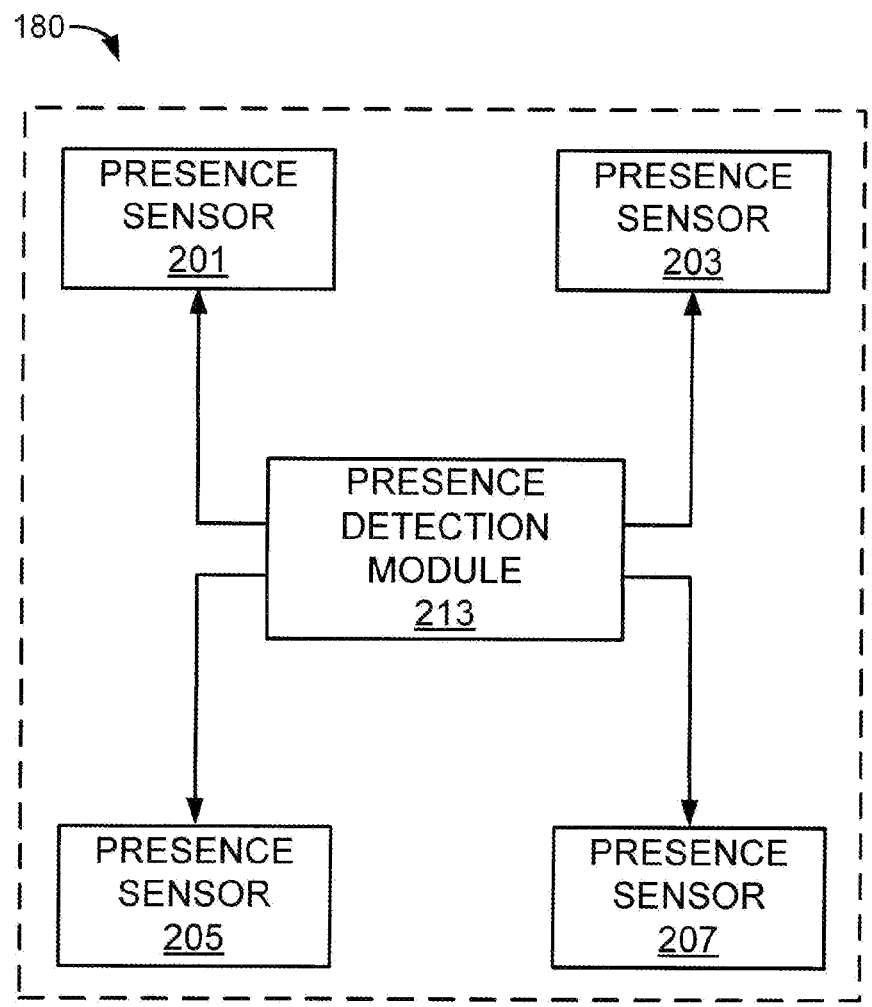
FIG. 2 is a modular schematic of the device of FIG. 1 for implementing embodiments of the presently disclosed principles.

Turning to FIG. 2, the example device 110 of FIG. 1 includes a presence detection system 180 as noted above. In the illustrated example, the presence detection system 180 includes one or more presence sensors 201, 203, 205, 207. The presence sensors 201, 203, 205, 207 may be of any suitable type, but in an embodiment, the presence sensors 201, 203, 205, 207 are noncontact sensors configured to respond to a nearby heat source or presence by providing a signal indicative of a magnitude of heat or other indicator emitted by the source. Examples of suitable noncontact sensors include pyroelectric sensors, digital/MEMS thermopiles and others.

For the sake of example, a thermopile sensor will be briefly described in greater detail. Such a sensor may include a silicon-based thermopile chip with a number of thermoelements having an IR absorbing covering and an IR (infrared) transmissive top filter or window. The top filter largely determines the spectral sensitivity range of the device. Thus, in operation, IR that passes through the top filter is absorbed in the IR absorbing covering, thus eliciting a thermal response signal from the underlying thermoelements. While many thermopile devices output an analog signal, a digital thermopile sensor (digipile) may instead be used for better device integration and lower complexity.

The presence sensors 201, 203, 205, 207 are controlled by a presence detection module 213. In operational overview, the presence detection module 213 receives the output of each presence sensor 201, 203, 205, 207 and processes the output to determine user presence and/or presence parameters with respect to each presence sensor 201, 203, 205, 207. The presence detection module 213 may analyze the overall thermal response of each sensor and adaptively determine a motion search sub-band width and or number.

Subsequently, the presence detection module 213 executes the determined search strategy and determines whether a user is present, and if so, determines one or more presence parameters. The configuration and operation of the presence detection module 213 will be discussed in greater detail with respect to FIGS. 4-9.

Figure 3:
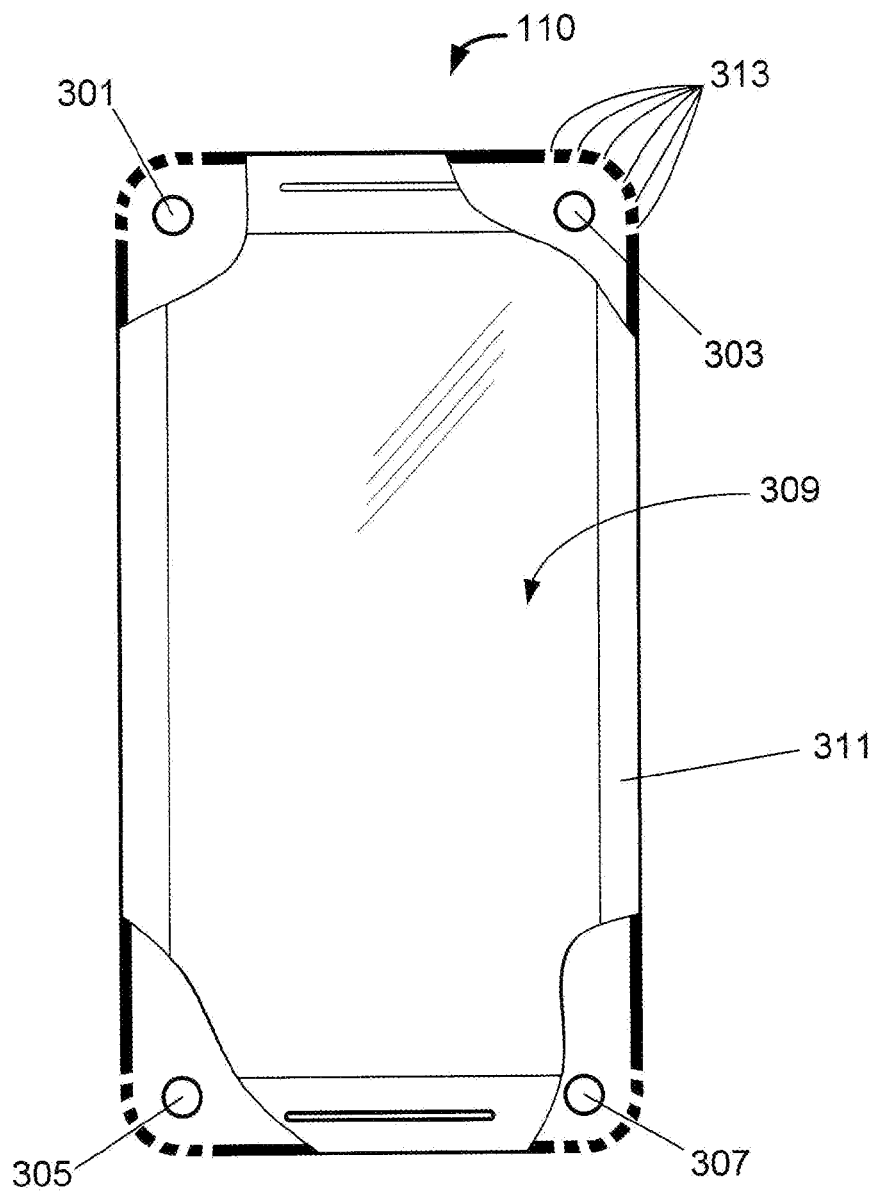
FIG. 3 is a partially cut away frontal view of the device of FIGS. 1 and 2 within which embodiments of the disclosed principles may be implemented.

While various physical configurations of the described components are possible, an example physical configuration is shown in FIG. 3, in a partial cut away view. In the illustrated example, the electronic device 110 is of a rectangular planform. In the view shown, the front of the electronic device 110 is visible, including a user interface screen 309. The user interface screen 309 may be the display screen 120 discussed with reference to FIG. 1, or in the alternative, multiple screens may be used.

The user interface screen 309 is enclosed by or affixed to a housing 311. In an embodiment, the housing 311 contains the components of the electronic device 110 as described by reference to FIGS. 1 and 2, as well as optional components or alternative components.

A number of presence sensors 301, 303, 305, 307 (corresponding, for example, to presence sensors 201, 203, 205, 207 of FIG. 2) are positioned within the housing 311, and generally beyond the periphery of the user interface screen 309. To simplify viewing of the placement of the presence sensors 301, 303, 305, 307 in the illustrated example, the interface screen 309 and housing 311 are shown partially cut away in those areas.

In the illustrated example, the lateral edges of the housing 311 are perforated by slots 313 at the corners. The slots admit IR radiation from heat sources and allow the outputs of the presence sensors 301, 303, 305, 307 to be processed to yield motion, direction and location information regarding a heat source.

Figure 4:
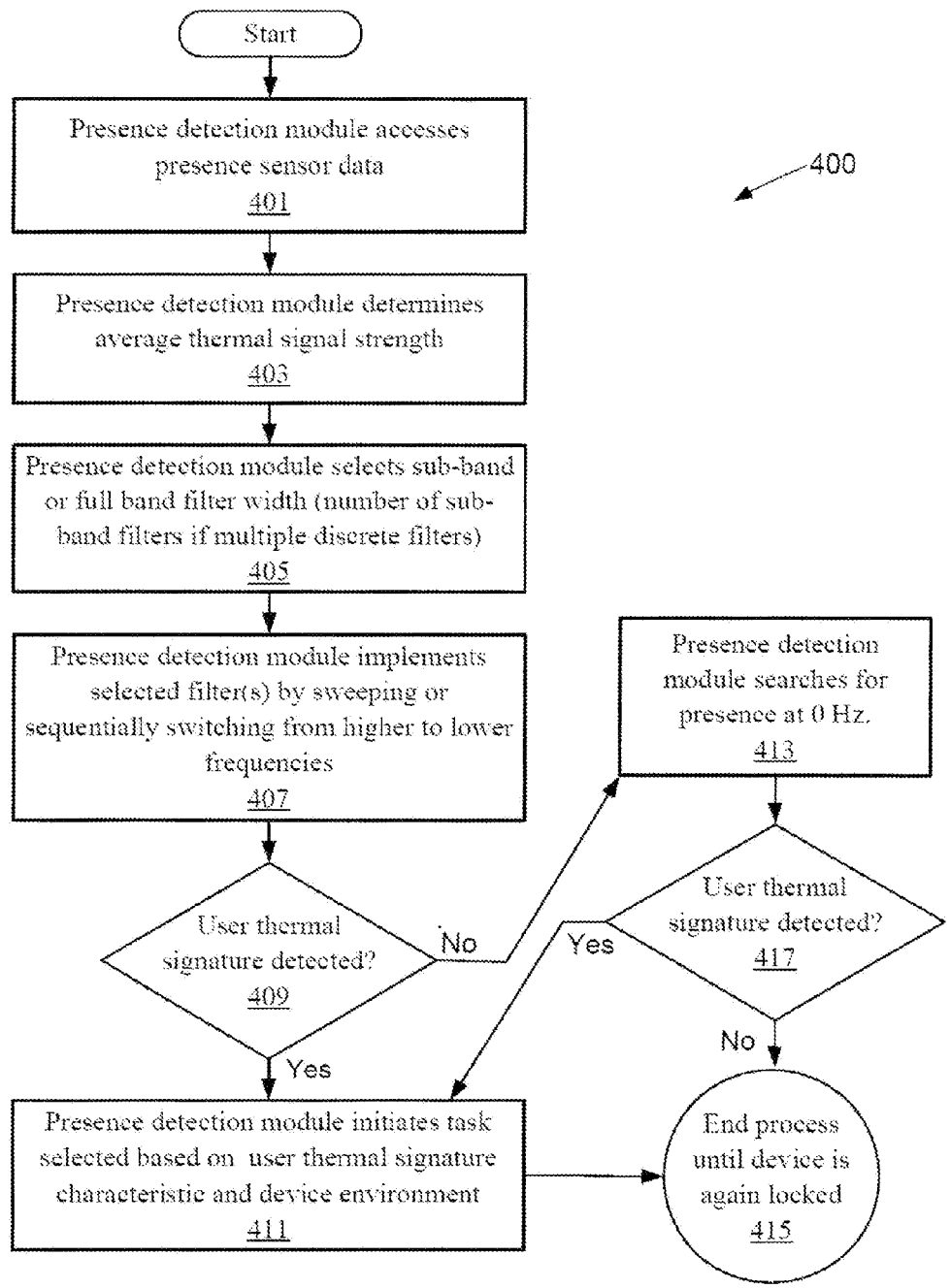
FIG. 4 is a flowchart showing an example process for executing presence detection in keeping with an embodiment of the disclosed principles.

Turning to FIG. 4, an example process 400 for detecting user presence is shown, and is described in the context of devices such as those shown in FIGS. 1-3. However, it should be appreciated that any other suitable device may instead be used. For example, although the illustrated device is shown to be a portable communication device such as a cellular phone, the described process 400 may also be applied in the context of tablet devices, laptop computing devices, and others.

The described process 400 may be executed by the presence detection module 213 as part of the presence detection system 180. More generally, the described steps are implemented via a processor, such as the processor 140 (FIG. 1), by retrieving computer-executable instructions, and optionally data or parameters, from a non-transitory computer-readable medium, and executing the retrieved instructions.

Referring to the specific example shown, the process 400 begins at stage 401, whereupon the presence detection module 213 polls the presence sensors 301, 303, 305, 307 or otherwise accesses periodic presence sensor data. The presence detection module 213 then processes the thermal signal data from each of the presence sensors 301, 303, 305, 307 to determine an average thermal signal strength at stage 403.

Figure 5:
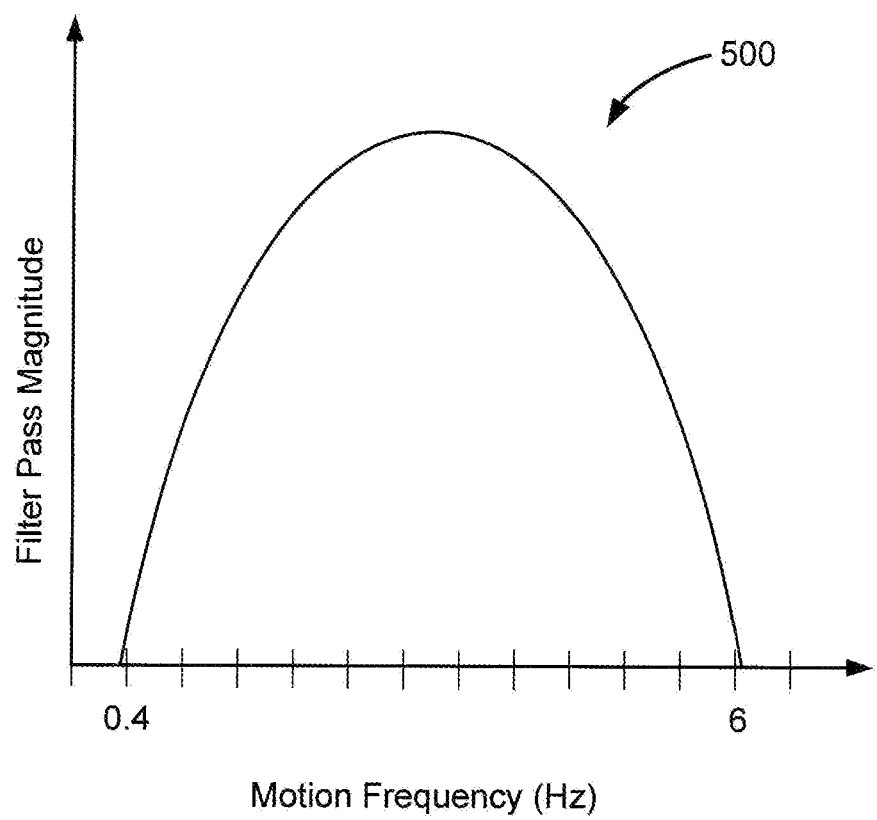
FIG. 5 is frequency plot showing the spectrum of a single broadband motion search filter in keeping with an embodiment of the disclosed principles.

Based on the average thermal signal strength, the presence detection module 213 selects at stage 405 a sub-band (or full band) filter width and, for the use of multiple discrete sub-band filters, the number of such filters. For example, in the case of a large average thermal signal strength, which potentially implies a nearby user, the presence detection module 213 may select a single broad filter covering the motion spectrum of interest. The spectrum of an example of such a filter is shown in FIG. 5. In particular, the filter 500 spans from about 0.1 Hz to about 6 Hz.

Figure 6:
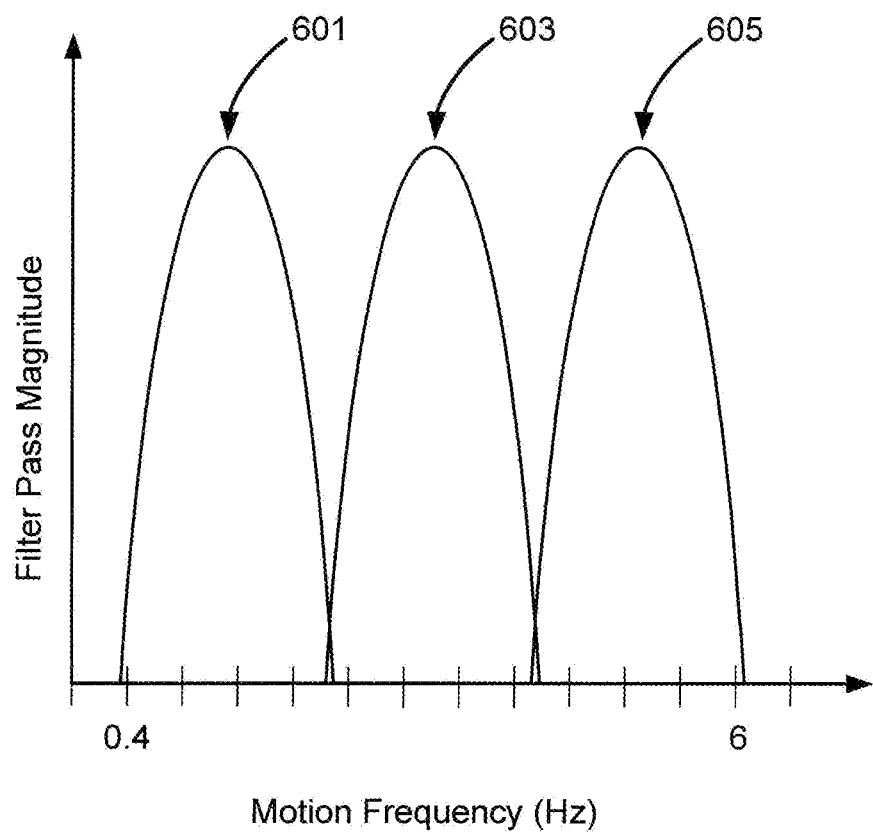
FIG. 6 is frequency plot showing the spectra of multiple sub-band motion search filters in keeping with an embodiment of the disclosed principles.

As another example, in the case of a mid size average thermal signal strength, indicating that a user is likely present though not nearby, the presence detection module 213 may select a set of narrower filters covering the motion spectrum of interest. The spectra of a set of such filters are shown in FIG. 6. In particular, a first filter is a high range filter having a spectrum 601 spanning from about 4 Hz to about 6 Hz. A second filter is a midrange filter having a spectrum 603 spanning from about 2 Hz to about 4 Hz. Finally, a third filter is a low range filter having a spectrum 605 spanning from about 0.1 Hz to about 2 Hz.

Figure 7:
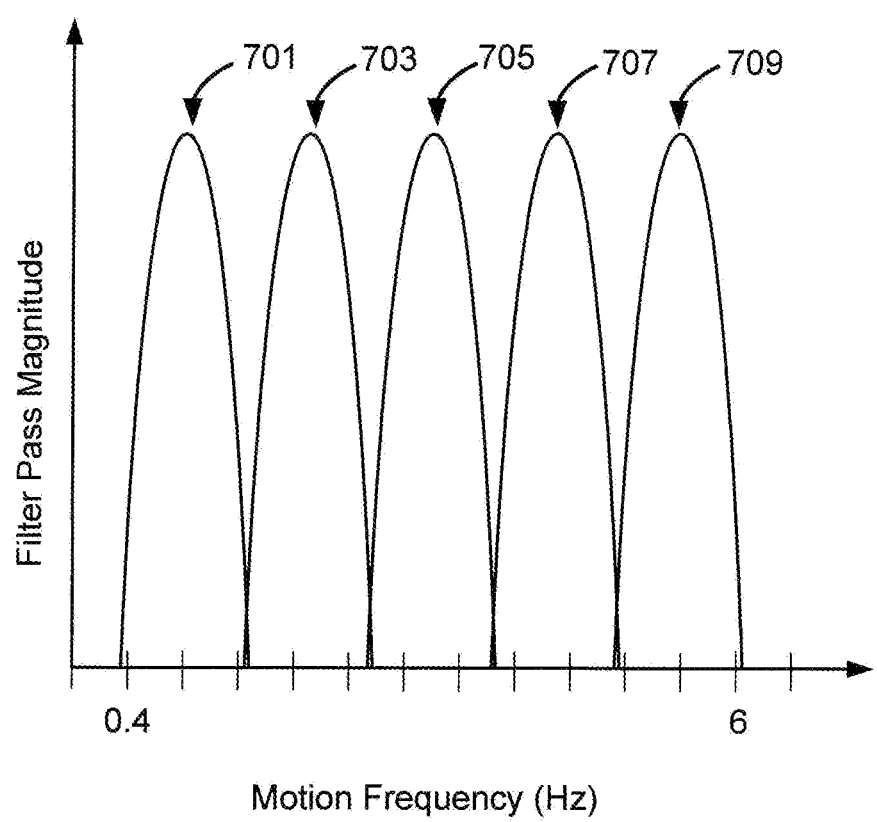
FIG. 7 is frequency plot showing the spectra of a greater number of yet narrower sub-band motion search filters in keeping with an embodiment of the disclosed principles.
Figure 8:
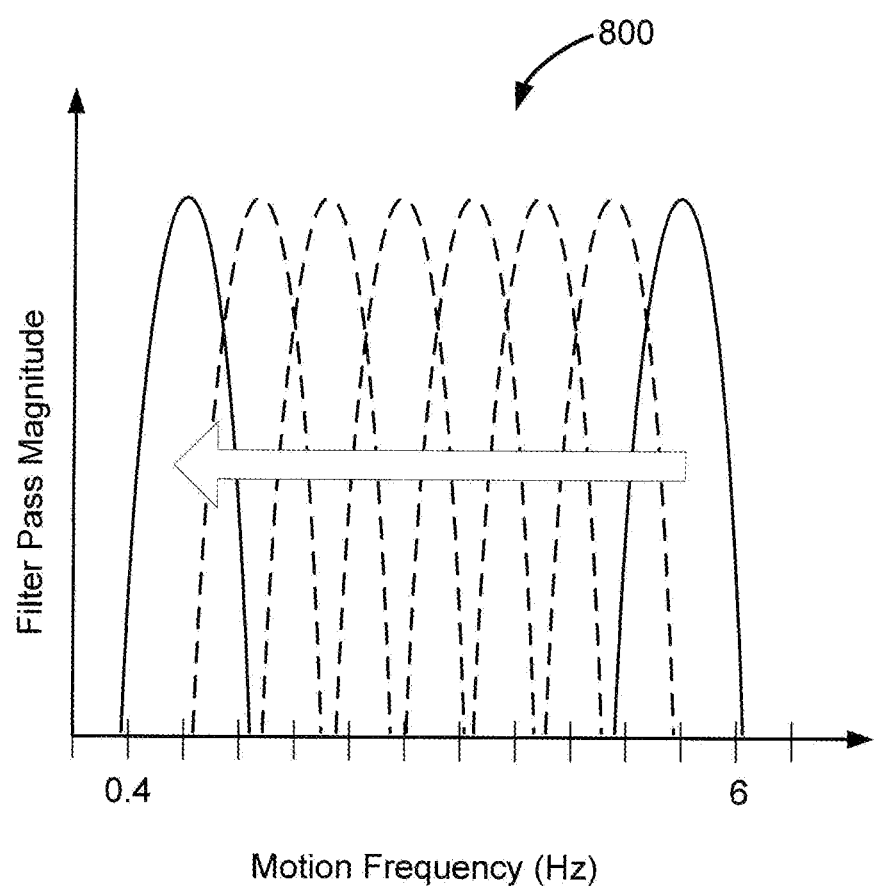
FIG. 8 is frequency plot showing the sweeping of a single narrow sub-band motion search filter in keeping with an embodiment of the disclosed principles.
Figure 9:
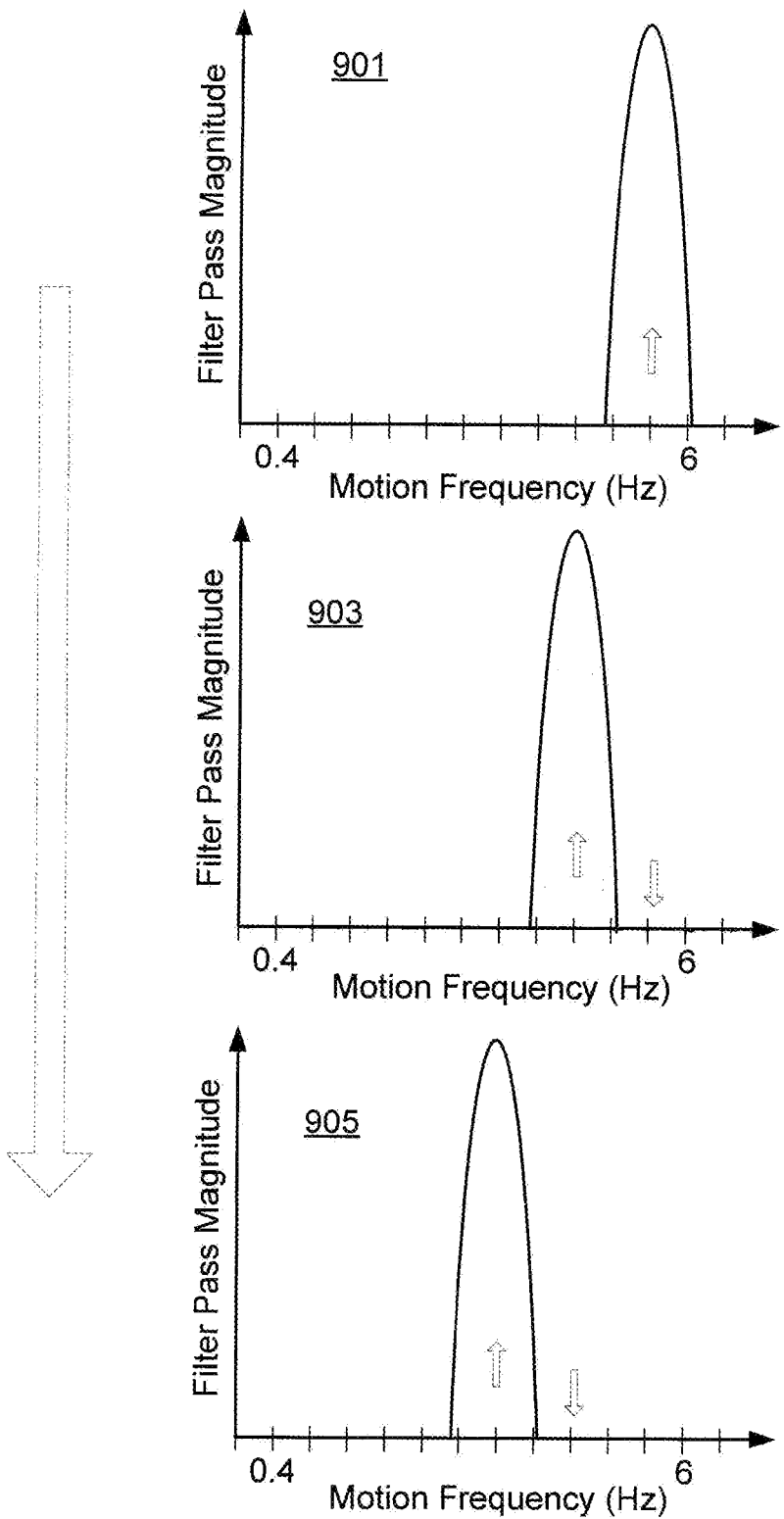
FIG. 9 is frequency plot showing the switching through of multiple narrow sub-band motion search filters in keeping with an embodiment of the disclosed principles.

Similarly, if the average thermal signal strength is small, this indicates that a user presence signature, if a user is present, will be similar in strength to any background noise. In this case, the presence detection module 213 may select a larger set of yet narrower filters covering the motion spectrum of interest. The spectra of a larger set of narrower filters are shown in FIG. 7. In particular, the illustrated set of filter spectra include five sub-bands (701, 703, 705, 707, 709) spanning the motion spectrum from about 4 Hz to about 6 Hz, each having a width of about 1.2 Hz.

Having selected at stage 405 a sub-band filter width and, for the use of multiple discrete sub-band filters, the number of such filters, the process 400 continues at stage 407. At this stage, the presence detection module 213 implements the selected filters by sweeping a sub-band filter of the selected width from the top of the motion spectrum to the bottom of the motion spectrum as shown in the sweep plot 800 of FIG. 8. In the case of multiple discrete sub-band filters, the sub-band filters are employed sequentially, e.g., as shown in the sequence of filter plots 901, 903, 905 shown in FIG. 9.

At stage 409, which may be executed during or after stage 407, the presence detection module 213 determines whether a user thermal signature has been detected; the process 400 flows to stage 411 if a user thermal signature is detected, and to stage 413 if a user thermal signature is not detected. As noted above, if stage 409 is executed in parallel with stage 407, the sweeping or switching of sub-band filters during stage 407 may be halted when the user thermal signature is detected.

At stage 411, which is reached as noted above if a user thermal signature is detected at stage 409, the presence detection module 213 initiates a task selected based on the nature of the user thermal signature and potentially on other device environment data such as touch, ambient noise, ambient light and so on. For example, if the user signature is large, is located in front of the device, and the user has touched the device, the presence detection module 213 may initiate an iris authentication process. In contrast, if the user signature is smaller but there is still a touch detected, the presence detection module 213 may initiate a gesture recognition process. From stage 411, the presence detection module 213 may proceed to stage 415 and exit the process 400 until the device again enters a locked state.

If the process 400 reaches stage 413, that is, if a user thermal signature is not detected at stage 411, the presence detection module 213 switches modes to search for a stationary presence, e.g., a presence having a thermal signature at substantially 0 Hz. In order to assess stationary presence while minimizing the effect of background thermal noise, the presence detection module 213 applies a narrow low pass filter in an embodiment.

At stage 417 the presence detection module determines whether a stationary presence has been detected in the 0 Hz search, and if so, the process flows to stage 411 for further action in keeping with the detected presence. Otherwise, the process proceeds to termination at stage 419.

It will be appreciated that various systems and processes for user presence detection have been disclosed. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. An electronic device with thermal user-sensing, the electronic device comprising:
a device housing;
a thermal sensor at least partially within the device housing; and
a device controller configured to sense a user presence via the thermal sensor by searching for a thermal signature of at least a predetermined magnitude or profile within a predetermined frequency band, wherein searching within the predetermined frequency band comprises searching within each of a plurality of sub-bands within the predetermined frequency band, and determining that a user is present if a thermal signature of at least the predetermined magnitude or profile is detected within any searched sub-band, and to stop searching within the predetermined frequency band when a user presence is detected, and to switch to a single filter over the entire predetermined frequency band when an overall thermal signal strength exceeds a predetermined switch limit.

2. The electronic device in accordance with claim 1, wherein the predetermined frequency band primarily extends from about 0.1 Hz to about 6 Hz, and wherein the device controller is further configured to determine a user speed of motion based on which searched sub-band yielded the thermal signature of at least the predetermined magnitude or profile.

3. The electronic device in accordance with claim 2, wherein the predetermined frequency band further comprises a separate sub-band that includes 0 Hz representing a motionless state.

4. The electronic device in accordance with claim 1, wherein the controller is further configured to search within the predetermined frequency band by switching among a plurality of sub-band filters corresponding to the plurality of sub-bands.

5. The electronic device in accordance with claim 4, wherein the width and number of the plurality of sub-band filters is selected based on overall thermal signal strength, wherein sub-band filter width increases continuously or discretely with increasing overall thermal signal strength, whereas the number of sub-band filters decreases continuously or discretely with increasing overall thermal signal strength.

6. The electronic device in accordance with claim 1, wherein the controller is further configured to search within the predetermined frequency band by sweeping a sub-band frequency filter through the entire spectrum of the predetermined frequency band.

7. The electronic device in accordance with claim 1, wherein the controller is further configured to search within the predetermined frequency band by starting the search at a first frequency and proceeding to a second frequency, the first frequency being higher than the second frequency.

8. The electronic device in accordance with claim 7, wherein the widths of the plurality of sub-band filters vary based on overall thermal signal strength, wherein higher overall thermal signal strengths correspond continuously or discretely to broader widths for each of the plurality sub-band filters.

9. A method of thermal user-sensing within an electronic device having a thermal sensor, the method comprising:

searching for a thermal signature of a predetermined amplitude range or profile within a predetermined frequency band by searching within each of a plurality of sub-bands within the predetermined frequency band;

determining that a user is present if a thermal signature of at least the predetermined amplitude range or profile is detected within any searched sub-band;

stopping searching within the predetermined frequency band when a user presence is detected; and switching to searching with a single filter over the entire predetermined frequency band when an overall thermal signal strength exceeds a predetermined switch limit.

10. The method in accordance with claim 9, wherein the predetermined frequency band primarily extends from about 0.1 Hz to about 6 Hz, the method further comprising determining a user speed of motion based on which searched sub-band yielded the thermal signature of at least the predetermined amplitude range or profile.

11. The method in accordance with claim 10, wherein the predetermined frequency band further comprises a separate sub-band that includes 0 Hz.

12. The method in accordance with claim 9, wherein searching within each of the plurality of sub-bands within the predetermined frequency band comprises switching among a plurality of sub-band filters corresponding to the plurality of sub-bands.

13. The method in accordance with claim 9, wherein searching within each of the plurality of sub-bands within the predetermined frequency band comprises sweeping a sub-band narrow band pass frequency filter through the entire spectrum of the predetermined frequency band.

14. The method in accordance with claim 9, wherein the width and number of sub-bands is selected based on overall thermal signal strength such that a higher overall thermal signal strength is associated with a lower number of sub-bands and a broader width for each sub-band.

15. A method of determining user presence from a portable electronic device comprising:

detecting an overall thermal signal magnitude;

searching for a thermal signature of a user within a predetermined spectrum by searching for a user thermal signature within each of a predetermined number of sub-bands which together span the predetermined spectrum, wherein the bandwidth and number of the predetermined number of sub-bands are selected in a continuous or discrete manner based on the overall thermal signal magnitude; and stopping searching and indicating a user presence when a user thermal signature is detected prior to all sub-bands being searched, and stopping searching and indicating a lack of user presence when a user thermal signature has not been detected when all sub-bands have been searched.

* * * * *